United States Patent [19]

Sellers et al.

[11] 4,300,180
[45] Nov. 10, 1981

[54] AMORPHOUS SPRING-SHIELD FOR TAPE CASSETTE

[75] Inventors: Gregory J. Sellers, Richmond, Va.; Kevin J. Durand, New Providence; Gerald R. Bretts, Livingston, both of N.J.

[73] Assignee: Allied Chemical Corporation, Morris Township, Morris County, N.J.

[21] Appl. No.: 108,186

[22] Filed: Dec. 27, 1979

[51] Int. Cl.³ .......................... G11B 15/60; G11B 5/11
[52] U.S. Cl. ............................... 360/130.33; 360/128
[58] Field of Search ........................... 360/130.33, 128

[56] References Cited

U.S. PATENT DOCUMENTS

| | | | |
|---|---|---|---|
| 3,789,157 | 1/1974 | Greiner et al. | 360/130.33 |
| 3,851,115 | 11/1974 | Zacaroli | 360/130.33 |
| 4,011,593 | 3/1977 | Gaiser | 360/130.33 |

*Primary Examiner*—Robert S. Tupper
*Attorney, Agent, or Firm*—Ernest D. Buff; Gerhard H. Fuchs

[57] ABSTRACT

A magnetic tape cassette is provided with a combined biasing and shielding member composed of flexible ferromagnetic material having at least 50 percent glassy structure. The member decreases construction costs and increases shielding of the magnetic tape recorder head during operation.

4 Claims, 1 Drawing Figure

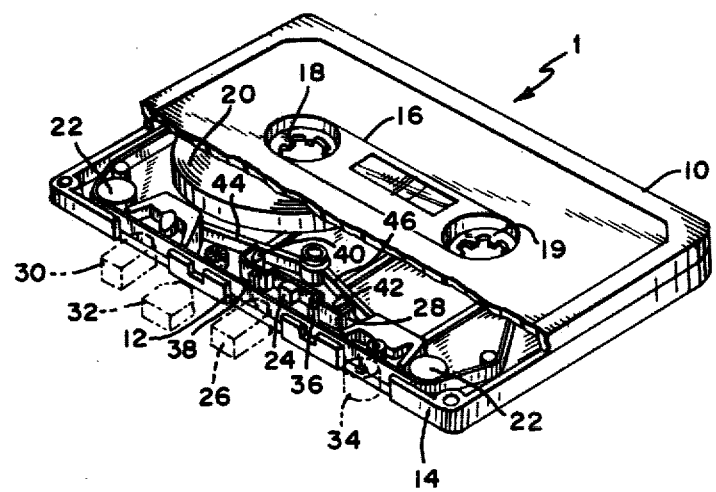

AMORPHOUS SPRING-SHIELD FOR TAPE CASSETTE

DESCRIPTION

1. Field of the Invention

This invention relates to magnetic tape cassettes, and more particularly to a cassette in which a single element presses the tape against a magnetic head and shields the head against disturbing magnetic fields in the vicinity thereof.

2. Description of the Prior Art

Magnetic tape cassettes for audio recorders generally have a compact structure including a magnetic tape contained within a housing. The tape is exposed through an opening in a peripheral wall of the housing. A magnetic head, adapted for recording and playback, projects through the opening into contact with the tape. Means are provided for maintaining pressure engagement between the tape and head, and for shielding the head from disturbing magnetic fields in the vicinity thereof.

One of the most troublesome problems with magnetic tape cassettes is the difficulty of shielding the head from disturbing magnetic fields emminating from transformers, d.c. motors, speaker coils and other sources of electromagnetic interference in the operating environment. Magnetic field leakage between the shield and head, resulting from misalignment thereof during manufacture or the relatively rough handling such cassettes receive during use, increases the noise level developed by the head during operation of the recorder. To maintain such noise within acceptable levels, the shield must be constructed to close tolerances and stabilized by the capturing structure of the cassette, and the recorder must be equipped with additional electronic mechanisms such as noise filters, signal processing components and the like. As a result, tape cassettes have been costly to construct and use.

SUMMARY OF THE INVENTION

The present invention provides a magnetic tape cassette which decreases construction costs and increases shielding of the recording head during operation. Generally stated, the cassette comprises a housing having an opening in a peripheral wall thereof. A winding means situated within the housing includes a winding core having a magnetic tape wound thereon. Guide means are provided for leading the tape from the winding core past the opening. A cushion means holds the tape against a magnetic head projected into the opening. Biasing and shielding means press the cushion means against the tape and shields the head against disturbing magnetic fields in the vicinity thereof. The biasing and shielding means is a unitary strip composed of flexible ferromagnetic material having at least 50 percent glassy structure.

BRIEF DESCRIPTION OF THE DRAWINGS

The invention will be more fully understood and further advantages will become apparent when reference is made to the following detailed description and the accompanying drawing which is a perspective view of one form of a tape cassette incorporating the present invention with a cutaway section showing a portion of the biasing and shielding means.

DESCRIPTION OF THE PREFERRED EMBODIMENTS

Referring to the drawing, there is illustrated one form of a magnetic tape cassette incorporating the biasing and shielding means of the present invention. Other forms of the cassette can also be used. The cassette, shown generally at 1 in the drawing should, therefore be interpreted as illustrative and not in a limiting sense. As illustrated, the cassette 1 has a housing 10 having an opening 12 in a peripheral wall 14 thereof. A winding means 16 is situated within the housing 10. The winding means 16 includes a winding core 18 having a magnetic tape 20 wound thereon. Guide means 22 are provided for leading the tape 20 from the winding core 18 past the opening 12. A cushion means 24 holds the tape 20 against a magnetic head 26 projected into the opening 12. A biasing and shielding means 28 presses the cushion means 24 against the tape 20 and shields the head 26 against disturbing magnetic field in the vicinity thereof.

Cassette 1 is typically composed from two half-housings and two winding cores 18, 19 adapted to wind magnetic tape 12 therebetween. Plural openings are provided in front wall 14 of cassette 12. Through which magnetic heads 26, 30 and 32 and pressure roller 34 project during operation. Support points 36, 38, 40, 42 serve together with walls 44, 46 to receive a combined shield and spring member 28. A cushion means 24 composed of a small felt cushion is fixedly mounted on the outer face of member 28. The latter is a unitary strip 28 composed of flexible ferromagnetic material having at least 50 percent glassy structure. Member 28 can be shaped and positioned within cassette 12 to conform with the shape of tape contact surface provided by a wide variety of magnetic heads 26 projected into cassette 12. Upon projection of head 26 through opening 12, the head 26 contacts the tape which is pressed thereagainst by cushion 24 and member 28. At the same time, the member 28 shields the head 26 from disturbing magnetic fields in the vicinity thereof. The force exerted by cushion 24 against tape 20 holds the tape 20 in continuous contact with head 26 under a load typically of the order of about 0.1 N to 0.2 N.

The biasing and shielding member 28 is in the form of an elongated, ductile amorphous metal strip having a composition consisting essentially of the formula

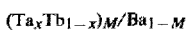

$$(Ta_xTb_{1-x})_M/Ba_{1-M}$$

Ta is at least one of iron and cobalt, Tb is selected from the group consisting of nickel, molybdenum, vanadium, chromium and copper and mixtures thereof. Ba is at least one of boron, phosphorus, carbon, silicon, nitrogen, germanium and aluminum, x ranges from about 20–100 atom percent and M ranges from about 70–90 atom percent.

Examples of amorphous metal compositions of strip 28 within the scope of the invention are set forth in Table I below:

TABLE I

|  |  | Fe | Co | Ni | Mo | B | P | Si |
|---|---|----|----|----|----|---|---|----|
| Fe—Ni—Mo—B | atom % | 40 | — | 40 | 2 | 18 | — | — |
|  | weight % | 45 | — | 47 | 4 | 4 | — | — |

TABLE I-continued

|  |  | Fe | Co | Ni | Mo | B | P | Si |
|---|---|---|---|---|---|---|---|---|
| Fe—Ni—P—B | atom % | 39.2 | — | 40.2 | — | 6.2 | 14.4 | — |
|  | weight % | 43.23 | — | 46.62 | — | 1.32 | 8.83 | — |
| Fe—Ni—B | atom % | 40. | — | 40. | — | 20. | — | — |
|  | weight % | 46.6 | — | 48.9 | — | 4.5 | — | — |
| Fe—B | atom % | 79.7 | — | — | — | 20.3 | — | — |
|  | weight % | 95.38 | — | — | — | 4.62 | — | — |
| Fe—Mo—B | atom % | 77.5 | — | — | 2.5 | 20 | — | — |
|  | weight % | 90.47 | — | — | 5.01 | 4.52 | — | — |
| Co—Fe—Mo— | atom % | 5.5 | 67.5 | — | 2 | 12 | — | 13 |
| B—Si | weight % | 6.19 | 80 | — | 3.86 | 2.61 | — | 7.34 |

Amorphous alloys especially suitable for use as member 28 are ferromagnetic and possess a maximum d-c permeability ($\mu$max) of at least $30 \times 10^3$. To be acceptable, the alloys must have tensile yield strength greater than the stress imposed during deflection of the spring 28 in use and a hardness low enough to prevent excessive deterioration of the punching die employed to fabricate the spring 28. Nickel containing alloys of the type set forth in Table I are softer than nickel-free alloys and, consequently, are easier and more economical to fabricate. The resistance to corrosion exhibited by the amorphous alloys of which member 28 is composed prolongs the useful life of the member 28 and prevents flakes or particles of corroded material fouling the head 26 or recorder transport mechanism (not shown). Those compositions of Table I wherein iron comprises the sole transaction metal are less resistant to corrosion, with the result that strip 28 formed from the latter is generally coated or plated with corrosion resistant material such as paint films, conversion coatings, electroplates or the like.

Examples of amorphous metal strip compositions that have been found unsuitable for use as a combined biasing and shielding member 28 for tape cassette 12 and set forth in Table II.

nized, and the molten alloy is rapidly quenched on a chill surface, such as a rapidly rotating metal cylinder.

Under these quenching conditions, a metastable, homogeneous, ductile material is obtained. The metastable material may be glassy, in which case there is no long-range order. X-ray diffraction patterns of glassy metal alloys show only a diffuse halo, similar to that observed for inorganic oxide glasses. Such glassy alloys must be at least 50% glassy to be sufficiently ductile to permit subsequent handling, such as stamping complex shapes of member 28 from ribbons of the alloys without degradation of the member's shielding capability. Preferably, the glassy metal member 28 must be at least 80% glassy to attain superior ductility.

The metastable phase may also be a solid solution of the constituent elements. In the case of the member 28 of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired fine-grained size of crystallites. Such metastable materials are also ductile when produced under the conditions described above.

TABLE II

| | Composition Percent | | | | | | | | | | |
|---|---|---|---|---|---|---|---|---|---|---|---|
| | Ni | Cr | B | Si | Fe | C | P | S | Al | Ti | Zr | Co |
| Atom % | 71.67 | 5.75 | 12.68 | 7.10 | 2.23 | .25 | .032 | .031 | .093 | .052 | .027 | .085 |
| Weight % | 84.40 | 6 | 2.75 | 4 | 2.5 | .06 | .02 | .02 | .05 | .05 | .05 | .1 |
| Atom % | 65.63 | 11.55 | 11.58 | 7.13 | 3.14 | .12 | — | — | — | — | — | .85 |
| Weight % | 76.97 | 12.0 | 2.5 | 4 | 3.5 | .03 | — | — | — | — | — | 1.0 |

Such compositions do not possess the requisite magnetic permiability for useful shielding.

Dimensions of the spring 28 are governed by the size of opening 12, the spring force of member 28, the size unshielded opening (not shown) in magnetic head 26 and the thickness to which spring 28 can be fabricated by rapid quenching techniques. Typically, the shield has a width at least equal to that of the tape 20 and a thickness ranging from about 25 micrometers to 75 micrometers.

The amorphous metal biasing and shielding member 28 invention is prepared by cooling a melt of the desired composition at a rate of at least about $10^5$° C./sec, employing metal alloy quenching techniques well-known to the glassy metal alloy art; see, e.g., U.S. Pat. No. 3,856,513 to Chen et al. The purity of all compositions is that found in normal commercial practice.

A variety of techniques are available for fabricating continuous ribbon. Typically, a particular composition is selected, powders or granules of the requisite elements in the desired portions are melted and homoge-

Having thus described the invention in rather full detail, it will be understood that these details need not be strictly adhered to but that various changes and modifications may suggest themselves to one skilled in the art, all falling within the scope of the present invention as defined by the subjoined claims.

We claim:

1. A magnetic tape cassette comprising:
   (a) housing having an opening in a peripheral wall thereof;
   (b) winding means including a winding core having a magnetic tape wound thereon;
   (c) guide means for leading said tape from said winding core past said opening;
   (d) cushion means for holding said tape against a magnetic head projected into said opening; and
   (e) biasing and shielding means for pressing said cushion means against said tape and shielding said head against disturbing magnetic fields in the vicinity thereof, said biasing and shielding means being a unitary strip composed of flexible, ferromagnetic material having at least 50% glassy structure, said ferromagnetic material having a maximum permeability of at least 30,000 and the formula $(Ta_xTb_{1-x})_MBa_{1-M}$ where Ta is at least one of iron and cobalt, Tb is selected from the group consisting of nickel, molybdenum, vanadium, chromium, copper and mixtures thereof, Ba is at least one of boron, phosphorous, carbon, silicon, nitrogen, germanium and aluminum, X ranges from about 20 to 100 atom percent, and M ranges from about 70-90 atom percent.

2. For use in a magnetic tape cassette comprising a housing having an opening in a peripheral wall thereof, winding means including a winding core having a magnetic tape wound thereon, guide means for leading the tape from said winding core past said opening and cushion means for holding said tape against a magnetic head projected into said opening, a biasing and shielding means for pressing said cushion means against said tape and shielding said head against disturbing magnetic fields in the vicinity thereof, the biasing and shielding means being a unitary strip composed of flexible, ferromagnetic material having at least 50% glassy structure, said ferromagnetic material having a maximum permeability of at least 30,000 and the formula $(Ta_xTb_{1-x})_MBa_{1-M}$ where Ta is at least one of iron and cobalt, Tb is selected from the group consisting of nickel, molybdenum, vanadium, chromium, copper and mixtures thereof, Ba is at least one of boron, phosphorous, carbon, silicon, nitrogen, germanium and aluminum, X ranges from about 20-100 atom percent, and M ranges from about 70-90 atom percent.

3. A biasing and shielding means as recited in claim 2, wherein said material has at least 80 percent glassy structure.

4. A biasing and shielding means as recited in claim 2, wherein said strip has a thickness ranging from about 25-75 micrometers.

* * * * *